No. 712,823. Patented Nov. 4, 1902.
R. MARSH.
GAS LAMP.
(Application filed Sept. 19, 1898.)
(No Model.) 2 Sheets—Sheet 1.
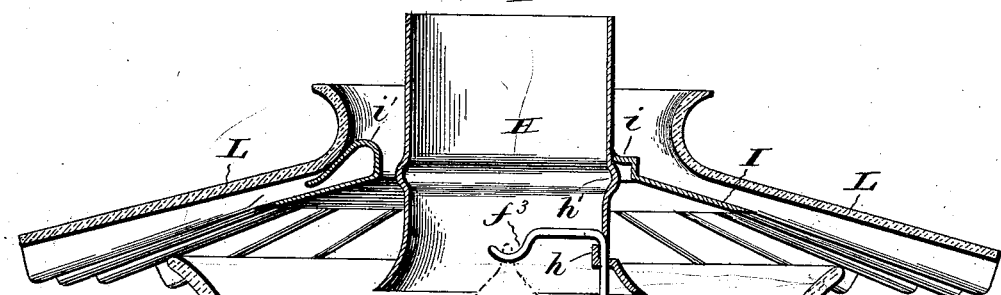
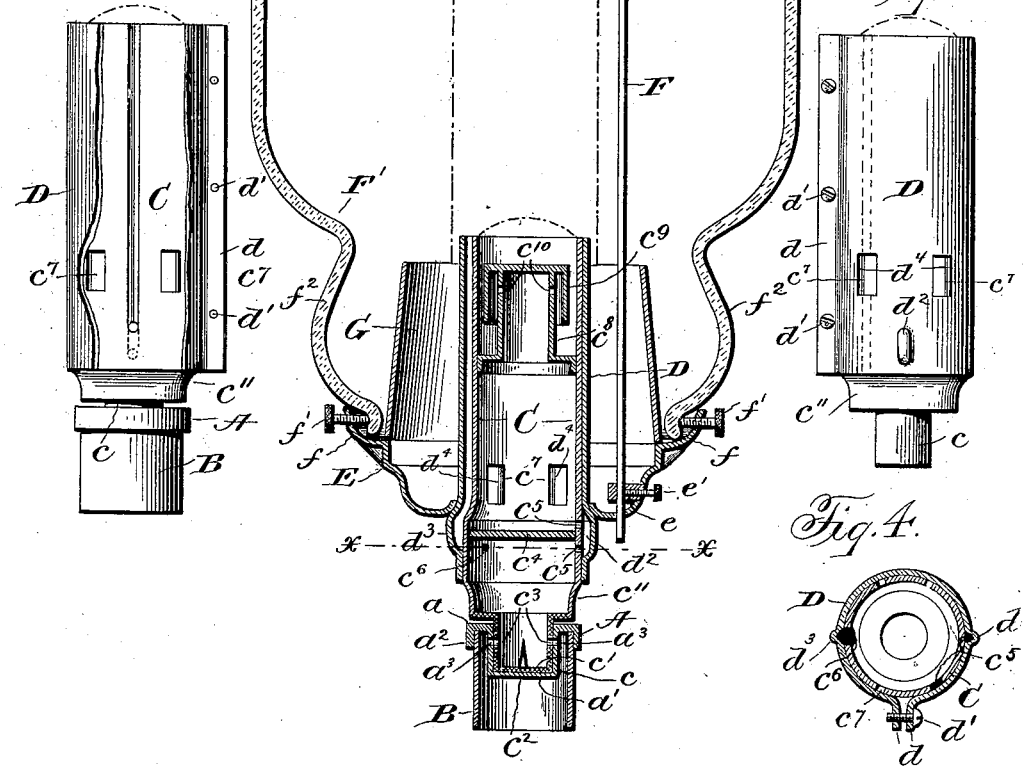
Witnesses:
Jas. E. Hutchinson.
Henry C. Hazard.
Inventor.
Riverius Marsh,
by Prindle and Russell,
his Attys.

No. 712,823. Patented Nov. 4, 1902.
R. MARSH.
GAS LAMP.
(Application filed Sept. 19, 1898.)
(No Model.) 2 Sheets—Sheet 2.
Fig. 5.
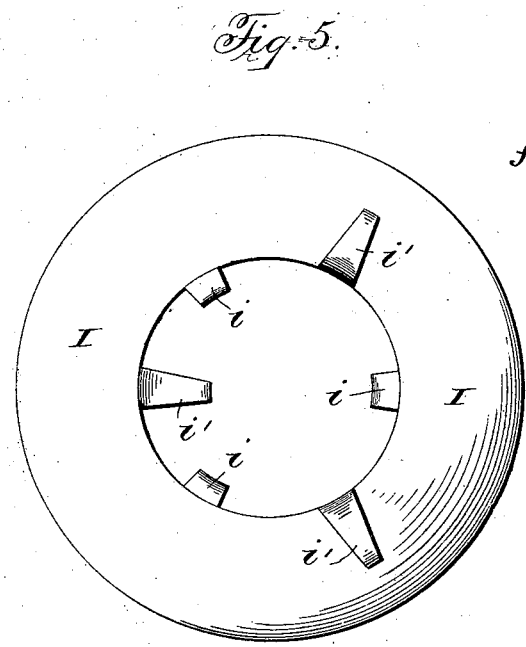
Fig. 6.
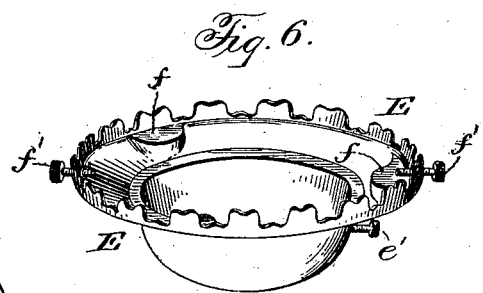
Fig. 7.
Fig. 8.
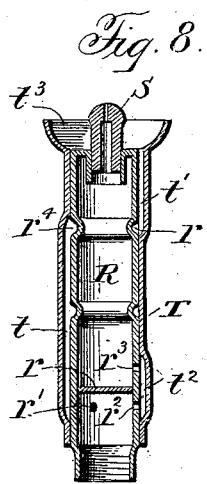
Fig. 9.
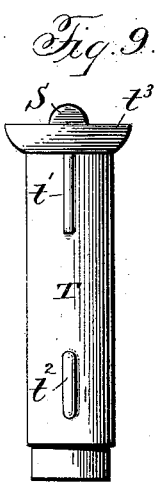
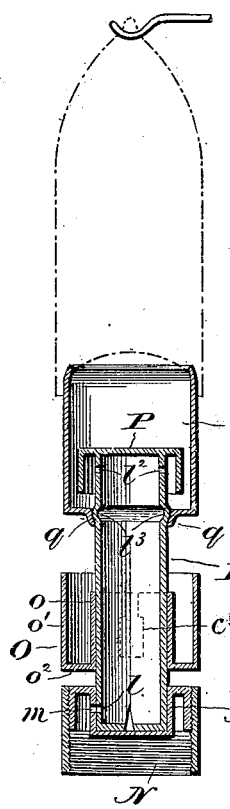
Witnesses:
Jas. E. Hutchinson.
Henry C. Hazard.
Inventor.
Riverius Marsh,
by Prindle and Russell,
his Attys.
THE NORRIS PETERS CO., PHOTO-LITHO., WASHINGTON, D. C.

UNITED STATES PATENT OFFICE.

RIVERIUS MARSH, OF NEW BRUNSWICK, NEW JERSEY, ASSIGNOR TO GEORGE W. GLAENTZER, OF NEW YORK, N. Y.

GAS-LAMP.

SPECIFICATION forming part of Letters Patent No. 712,823, dated November 4, 1902.

Application filed September 19, 1898. Serial No. 691,402. (No model.)

*To all whom it may concern:*

Be it known that I, RIVERIUS MARSH, of New Brunswick, in the county of Middlesex, State of New Jersey, have invented certain new and useful Improvements in Gas-Lamps; and I do hereby declare that the following is a full, clear, and exact description thereof, reference being had to the accompanying drawings, in which—

Figure 1 is a vertical sectional view of a lamp embodying my invention. Fig. 2 is a side elevation of the burner, the outer tube being broken away. Fig. 3 is a side elevation of the burner, the parts being shown unbroken. Fig. 4 is a sectional view taken on the line $x\ x$ of Fig. 1. Fig. 5 is a plan view of the shade-holder. Fig. 6 is a perspective view of the globe-holder, and Fig. 7 is a vertical sectional view of a burner which is another embodiment of my invention, and Figs. 8 and 9 are respectively a vertical sectional view and a side elevation of a third embodiment of my invention.

Letters of like name and kind refer to like parts in each of the figures.

The object of my invention has been to provide a gas-lamp which shall have, among other advantages, those of being cheap and simple in construction, of being capable of being lighted, regulated, and extinguished from the outside, of having both a large and a taper light, of having a burner of which the main tubes can be constructed of sheet metal without drawing, of confining the heat near the burner and maintaining the globe at a comparatively low temperature, of maintaining a steady light in a wind, and of combining in one compact structure a part which shall be capable of performing the functions of a large and a small burner, a mixer, a gas-cock, a by-pass, an air-regulator, and a gas-regulator; and to such ends my invention consists in the gas-lamp hereinafter specified.

In carrying my invention into practice I provide a cap A, which consists of a preferably cylindrical part $a$, whose lower end is closed by a bottom $a'$ and whose upper end unites with an annular part $a^2$, from the outer edge of which depends an annular flange. The said flange is adpted to fit over and preferably to be screwed to the upper end of a gas-supply pipe B. The burner proper consists of an inner tube C and an outer tube D, the former being formed with a projection $c$, which is received within and closely fits the part $a$ of the cap A. The projection $c$ preferably has a closed bottom $c'$, and its vertical wall is split, as at $c^2$, to make the projection elastic, so that it will be frictionally held within the cap and while capable of movement within the cap will tend to remain in the position in which it is left. The projection $c$ is provided with an aperture or apertures $c^3$ and $c^3$, and the part $a$ is provided with a corresponding aperture or apertures $a^3$ and $a^3$, and gas can be permitted to flow into the inner tube by turning the apertures in the said parts into or out of coincidence, respectively. Above the projection $c$ the inner tube C is preferably enlarged and extends upward with circular cross-section. Near its lower end the inner tube is provided with an imperforate diaphragm $c^4$, above and below which apertures $c^5$ and $c^5$ are formed in the said tube. The outer tube D is seated upon and fits closely around the inner tube and is preferably provided with a bead or outwardly-extending flanges $d$ and $d$, the sides of the bead or the lips being drawn together by screws $d'$ and $d'$, so as to draw the outer tube closely around the inner tube. At a point in the outer tube on a level with the apertures $c^5$ and $c^5$ is formed a preferably vertical groove or offset $d^2$ in the inner surface of the outer tube, so that when said groove or offset is in line with the said apertures it forms a connection between them by which the gas can pass from the portion of the inner tube that is below the diaphragm to the portion of the tube that is above the diaphragm. If desired, a series of apertures $c^5$ and $c^5$ of varying sizes can be formed, so that each pair of apertures can be separately put into communication with each other. An aperture $c^6$ is also formed in the inner tube below the diaphragm, and a groove or offset $d^3$ is formed in the inner face of the outer tube D, such groove or offset at the level of the aperture $c^6$ communicating with a groove formed either in the outer surface of the inner tube or in the inner face of the outer tube and extending to the top of the tubes, and thus serving to form a taper light. The various offsets and apertures are preferably so positioned that but one offset and its aperture or apertures can be in communication at the same time, and they are arranged in two opposite series, so that a rotation of the outer tube in either direction will result in alternately raising and lowering the light and in lighting the taper light. Such communication can be effected either by a relative rotation of the inner tubes or by a relative longitudinal sliding of one upon the other. Above the diaphragm apertures $c^7$ and $c^7$ are provided in the inner tube, and corresponding apertures $d^4$ and $d^4$ are formed in the outer tube, so that when such apertures are placed in coincidence air will be admitted to the inner tube. The latter apertures and the apertures $c^5$ and offset $d^2$ are placed so that the air and gas are admitted to the upper portion of the inner tube at the same time.

A preferably cylindrical part $c^8$ is secured in the upper part of the inner tube, as by a flange at its lower end, and on the upper end of such part is secured or formed an inverted-cup-shaped part $c^9$, whose vertical wall hangs below the upper end of the cylindrical part. An aperture or apertures $c^{10}$ and $c^{10}$ are formed in the part $c^8$ above the lower edge of the cup-shaped part $c^9$, so that the air and gas are compelled to travel up, then down, and finally up again before reaching the upper end of the inner tube. This circuitous passage serves to thoroughly commingle the air and gas, and thus to effect economy, to prevent ignition from passing back below the diaphragm, which action is known as "lighting back," and also shortens the length of the mixer-tube. The number of the parts $c^8$ and $c^9$ can be varied to make the path of the air longer or more tortuous. At the upper end of the inner tube the usual wire-gauze can be placed, if desired. The upper ends of the inner and outer tubes are preferably normally flush with each other; but the inner tube preferably extends below the outer tube, so as to provide a handle $c^{11}$, by which it may be grasped. The lower portion of the outer tube also serves as a handle, and the two tubes can thus be moved relative to each other.

A globe-holder E is passed over the upper end of the outer tube and is seated on projections on said tube, such as the two offsets $d^2$ and $d^2$ formed therein. A socket $e$ is formed on or attached to the globe-holder, in which the lower end of the mantle-holder F can be placed. A screw $e'$ is threaded into a wall of the socket to secure the mantle-holder in the desired position. A globe F' is seated on a bead or on projections $f$ and $f$, (see Fig. 6,) formed on the upper surface of the globe-holder, the projections serving to hold the globe away from the body of the globe-holder, and thus to admit air, but by a circuitous passage through which drafts cannot easily pass. The usual screws $f'$ and $f'$ are provided for fastening the globe in place. The globe is provided with a neck $f^2$ at about the level of the burner-top, which neck serves to diffuse the light and to provide a heat zone about the burner. A preferably frusto-conical lower chimney-section G is supported within the globe by the globe-holder, and such section is preferably supported out of direct contact with the globe-holder by the projections $f$ and $f$ formed on the upper surface of the latter, so that air can pass under the said lower chimney-section and reach the burner.

The upper end of the mantle-holder F is bent horizontally and is provided with a hook $f^3$, by which it can support the mantle. An upper chimney-section H is provided, and such section is preferably supported on the mantle-holder, with which it is engaged, as by a loop $h$, that is formed as by striking up the metal of the chimney-section, the holder being threaded through the loop. A bead $h'$ is formed on the chimney-section H, and a shade-holder I rests on the said bead and is supported thereby. The said shade-holder consists, preferably, of an annular slightly frusto-conical plate having lips $i$, that project inward from its inner edge and that are supported on the said bead, and also having, preferably, spring-arms $i'$, that project inward from the said edge and are then curved upward, outward, and downward. Upon the spring-arms rests a shade K, the latter having a central opening which is larger than the diameter of the chimney, so that an air-passage is formed between such parts. The opening in the shade-holder is also of larger diameter than the chimney to provide an air-passage between the said parts. The shade-holder protects the shade from the direct heat of the burner.

In the operation of my lamp, as illustrated in Figs. 1 to 5, the inner tube is rotated within the cap A, so as to bring the apertures $c^3$ and $a^3$ into coincidence, thus permitting gas to flow from the pipe B into the lower end of the inner tube. The inner and outer tubes are then turned in one direction or the other to produce the size or kind of light that is desired, the gas passing out through an aperture below the diaphragm, through an offset, and into the inner tube above the diaphragm by a second aperture or passing up through the offset and groove to the taper light, as the case may be. If the main light is being used, the gas above the diaphragm meets with air coming through the air-apertures in the two tubes and mixes therewith. The mixture thus formed passes up through the cylindrical part $c^8$, out through its apertures, down under the cup-shaped part $c^9$, and up to the gauze, above which it is burned and heats the mantle. Air enters the lamp between the lower edge of the globe and the upper surface of the globe-holder, and part of it passes upwardly between the chimney and the lower chimney-section and escapes between the shade and the shade-holder, thus serving to protect the globe and the shade from direct heat from the burner. The remainder of the air entering under the lower edge of the globe passes under the lower edge of the lower chimney-section and from thence either enters through the air-apertures into the inner tube or is thrown by the conical wall of the lower chimney-section in a circular draft against the mantle, where it serves to perfect the combustion. The air and gases passing upward from the burner and from the interior of the lower section are either induced, received, and expelled by the upper chimney-section or pass between such section and the shade-holder. It will thus be seen that there are a series of concentric upwardly-moving currents of air and gases within my lamp, which serve to provide ample oxygen for combustion and also to protect the globe and shade from direct heat from the burner. The indirect passage of the air between the globe and lower chimney-section and the globe-holder serves to prevent danger from drafts, and consequently to prevent lighting back or the extinguishment of the lamp.

It is obvious that various changes can be made in the structure I have illustrated which are within the scope of my invention. For instance, in Fig. 7 is illustrated a burner in which the inner tube L is formed at its lower end in the same manner as the lower end of the corresponding tube illustrated in Fig. 1 and is seated in a cap M, which is screwed into the upper end of the gas-pipe N. In the sides of the tube and cap are formed openings $l$ and $m$, which when placed in coincidence admit gas from the pipe N to the interior of the tube L. Above its lower end the tube L has openings $l'$ and $l'$, which correspond with openings in a shutter O, which shutter is in the form of an inner and outer piece of tubing $o$ and $o'$, respectively, which are connected, as by a ring $o^2$, at the bottom, openings $o^3$ being formed in the inner tube. When the openings $o^3$ and $l'$ are made to coincide, air can pass into the inner tube. On the upper end of the inner tube an inverted-cup-shaped part P is secured, and openings $l^2$ are formed in the inner tube above the level of the lower edge of the cup, so that the mixture of air and gas can pass from the inner tube to the interior of the cup and then down beneath the lower edge of the latter, from whence it can pass upward to be burned. A bead $l^3$ is formed in the inner tube L below the level of the edge of the cup, and an outer tube Q is secured to the inner tube by having a flange $q$, which bears against and engages the said bead. The outer tube is of larger diameter than the cup and carries at its upper end the usual wire screen. It will be seen that in the construction illustrated in Fig. 7 the air and gas can be separately regulated.

In Figs. 8 and 9 is illustrated a burner involving the principles of the burner illustrated in Fig. 1, which is adapted for the alternate production of a fish-tail flame or a taper light. The said burner comprises an inner tube R, which is adapted at its lower end to be secured to a gas-pipe and at its upper end to receive an ordinary lava tip S. An outer tube T fits snugly around the inner tube. Within the lower portion of the inner tube a diaphragm $r$ is secured or formed, and beneath the said diaphragm are two openings $r'$ and $r^2$, respectively, which openings are formed in the walls of the tube. Above the opening $r'$ and above the diaphragm a third opening $r^3$ is formed in the inner tube. A groove $r^4$ is formed in the outer surface of the inner tube, and a groove $t$ is formed in the inner surface of the outer tube. A second groove $t'$ is formed in the inner surface of the outer tube on the side opposite to the groove $t$. A groove $t^2$ is formed in the inner wall of the outer tube, which groove extends from the level of the opening $r^2$ to that of the opening $r^3$. When the outer tube is turned so that its groove $t$ is in line with the opening $r'$, the gas can pass through the said groove and through the grooves $r^4$ and $t'$ to the upper end of the inner tube, where it can burn as a taper light. A shell $t^3$, formed on the upper end of the outer tube, protects such light from drafts. When the outer tube is turned so that its groove $t^2$ is in line with the openings $r^2$ and $r^3$, the gas can pass by the diaphragm $r$ and reach the tip, where it can burn in a fish-tail or other flame.

Having thus described my invention, what I claim is—

1. In a lamp, the combination of a cap which is adapted to be secured to a gas-pipe, said cap having a cup-shaped part, of a burner-tube which is adapted to fit and to be inserted into said cup-shaped part, said tube and cup-shaped part having openings which can be made to register, substantially as and for the purpose described.

2. In a lamp, the combination of a cap which is adapted to be secured to a gas-pipe, said cap having a cup-shaped part, of a burner-tube which is adapted to fit and to be inserted into said cup-shaped part, said tube and cup-shaped part having openings which can be made to register, and said tube being split, whereby it is provided with elasticity in order that it may closely fit the interior of said cup-shaped part, substantially as described.

3. In a lamp, the combination of an inner and an outer tube, said inner tube having a series of openings which are graduated from smaller to larger and then to smaller again, and said inner tube having corresponding gas-passages, whereby relative movements, in a single direction, of said tubes in either direction may be made to increase and then decrease the supply of gas, substantially as described.

4. In a lamp, the combination of an inner tube and an outer tube, said inner tube having an opening in its walls and said outer tube having an interior groove whereby gas may be permitted to pass through said opening and through such groove to the ends of said tubes for the formation of a taper light, substantially as described.

5. In a lamp, the combination of an inner and an outer tube, said inner tube having a diaphragm extending across the same at a point between its ends, having connection above said diaphragm, with a larger burner-opening, and having connection below said diaphragm with a source of supply of gas, said inner tube having an opening in its walls, and said outer tube having a groove opposite said opening, said groove extending to the end of said outer tube where it forms a smaller burner-opening, and means operated by the relative rotation of said tubes, for admitting gas to the portion of said inner tube above said diaphragm, whereby gas may be admitted either to said larger or to said smaller burner-opening, substantially as described.

6. In a lamp, the combination of an inner tube having a diaphragm extending across the same intermediate its ends, and having a zigzag passage above said diaphragm through which gases may be made to pass to reach the upper end of the tube, and an outer tube, said inner tube having openings above and below said diaphragm, and said outer tube having corresponding grooves, whereby, by the relative rotation of said tubes, gas may be permitted to pass said diaphragm and enter said zigzag passage, or whereby gas may be permitted to pass through one of said grooves to form a taper light, substantially as described.

7. In a lamp, the combination of an inner tube and a sheet-metal outer tube, said inner tube having a diaphragm between its ends and having openings in its walls, above and below said diaphragm, said outer tube having a corresponding bead formed in its walls in position to act as a passage between said openings, said bead protruding from the outer surface of the tube.

8. In a lamp, the combination of an inner tube and an outer tube, said tubes having corresponding passages for the passage of gas, whereby said tubes form a valve, said outer tube having vertical flanges extending substantially radially therefrom, and means for drawing said flanges together to cause said outer tube to snugly fit said inner tube, substantially as described.

9. In a lamp, the combination of an inner tube having a diaphragm extending across the same and having a smaller tube secured within itself, a cup-shaped part closing the upper end of said smaller tube, and having its sides extending downwardly, said smaller tube having an opening above the level of the cup-shaped part, an outer tube having grooves within its inner surface, openings below said diaphragm in the walls of said inner tube, said openings being at the same level as portions of said grooves, an opening in the inner tube above the level of said diaphragm, and corresponding air-admitting openings formed both in said inner and said outer tubes, substantially as described.

10. In a lamp, the combination of a mixer-tube, a cylindrical part within which the lower end of said mixer-tube is received, said part and said lower end having corresponding openings, whereby the passage of gas may be regulated, and a shutter-tube fitting the upper part of said mixer-tube, said mixer and shutter tubes having corresponding openings, whereby the passage of gas and air may be regulated, substantially as described.

11. In a lamp, the combination of a mixer-tube, a cylindrical part within which the lower end of said mixer-tube is received, said part and said lower end having corresponding openings whereby the passage of gas may be regulated, and a shutter-tube fitting the upper part of said mixer-tube, said mixer and shutter tubes having corresponding openings, whereby the passage of gas and air may be regulated, said mixer-tube having a gas-mixer in its upper portion, substantially as described.

12. In a lamp, the combination of a plurality of burners, an inner gas-containing tube, and an outer tube, said outer tube having passages, each of which leads to one of said burners, said inner tube having openings that can be made to register with said passages, whereby gas can be admitted to any one of said burners, substantially as described.

13. In a lamp, the combination of a globe-holder, globe-supporting seats or projections within such globe-holder and below the upper edge thereof, a globe supported on such seats or projections, the bottom of such globe being smaller in diameter than the globe-holder at the level of the former, thereby forming a passage between the globe-holder and the globe, and a lower chimney-section supported in said globe-holder and smaller in diameter at its bottom than the globe at the level of the former, substantially as described.

14. In a lamp having a mantle, the combination of a tube normally above the mantle, and a mantle-holder which supports said tube.

15. In a lamp, the combination of a burner, a globe-holder supported by said burner, a globe supported by said globe-holder, a mantle-holder supported by said globe-holder, and an upper chimney-section and shade supported by said mantle-holder, substantially as described.

16. The combination of a shade-holder, an upper chimney-section supported thereby, an annular shade-holder supported by said chimney-section, there being a bead on the chimney-section, and fingers extending from the one edge in said shade-holder to said chimney above said bead, and fingers extending from said shade-holder outwardly, and a shade supported upon said last-mentioned fingers.

17. A shade-holder for use in a lamp, consisting of an annular plate having arms integral therewith and projecting from its inner edge, some of which arms project inwardly and are adapted to support the shade-holder upon the lamp, and other of which arms are bent upwardly and outwardly and are adapted to support a shade, substantially as and for the purpose described.

In testimony whereof I affix my signature in presence of two witnesses.

RIVERIUS MARSH.

Witnesses:
H. M. WYRTZEN,
CHARLES BEAN.